(12) United States Patent
Ohm et al.

(10) Patent No.: US 8,573,046 B1
(45) Date of Patent: Nov. 5, 2013

(54) COMBINED TREAD DEPTH MEASUREMENT TOOL AND PNEUMATIC PRESSURE GAUGE SYSTEMS AND METHODS

(75) Inventors: Patrick L. Ohm, Mesa, AZ (US); C. Kwai Kong, Gilroy, CA (US)

(73) Assignee: Bell Automotive Products, Inc., Scottsdale, AZ (US)

( * ) Notice: Subject to any disclaimer, the term of this patent is extended or adjusted under 35 U.S.C. 154(b) by 126 days.

(21) Appl. No.: 13/343,649

(22) Filed: Jan. 4, 2012

Related U.S. Application Data

(60) Provisional application No. 61/429,699, filed on Jan. 4, 2011.

(51) Int. Cl.
*B60C 23/02* (2006.01)
*G01M 17/02* (2006.01)

(52) U.S. Cl.
USPC .......................................... 73/146.3; 73/416

(58) Field of Classification Search
None
See application file for complete search history.

(56) References Cited

U.S. PATENT DOCUMENTS

| | | | |
|---|---|---|---|
| 3,269,019 A | 2/1965 | Krohn | |
| 3,696,668 A | 10/1972 | Patrick | |
| 4,526,030 A * | 7/1985 | Vecera, Jr. | 73/146.8 |
| 4,770,044 A | 9/1988 | Ferris | |
| 4,858,467 A | 8/1989 | Weng | |
| 4,884,175 A * | 11/1989 | Weng | 362/119 |
| 4,916,944 A | 4/1990 | Ho-Chuan | |
| 4,970,894 A | 11/1990 | Huang | |
| D317,880 S | 7/1991 | Meehan | |
| 5,033,294 A | 7/1991 | Huang | |
| D320,170 S | 9/1991 | Hwang | |
| 5,233,864 A | 8/1993 | Huang | |
| 6,055,854 A * | 5/2000 | Chen | 73/146.8 |
| 2006/0000266 A1* | 1/2006 | Yohr | 73/146 |

FOREIGN PATENT DOCUMENTS

| | | |
|---|---|---|
| CN | 201340321 Y | 11/2009 |
| EP | 707204 A2 | 4/1996 |

OTHER PUBLICATIONS

Pencil Type Tire Pressure Gages. Milton, 2011 catalog, p. 50.
Accutire Pen Style Tire Pressure Gauge, http://www.autogeek.net/accutirepencil.html.
Tire tool key tag. Pressure and tread depth gauge in one handy tool. Toyo Tires.

\* cited by examiner

*Primary Examiner* — Lisa Caputo
*Assistant Examiner* — Jermaine Jenkins
(74) *Attorney, Agent, or Firm* — Booth Udall Fuller, PLC

(57) ABSTRACT

A combined tread depth measurement tool and pressure gauge for treaded pneumatic tires includes a housing, an abutment surface, and a pneumatic pressure sensor. The pneumatic pressure sensor includes a measurement element with a graduated numerical indication of pneumatic pressure on at least one side and a colored indication of tire depth on at least one side. The colored indication includes at least three distinct colors, the three distinct colors each having widths corresponding to ranges of tread depths in reference to a terminal end of the measurement element. A combined tread depth measurement tool and pressure gauge for treaded pneumatic tires includes a body assembly and a spring clip. The body assembly includes a housing with three color bands having distinct colors, a pneumatic pressure sensor, and a measurement element. The spring clip includes a sliding portion and a clip portion with a tire engagement end.

14 Claims, 6 Drawing Sheets

US 8,573,046 B1

COMBINED TREAD DEPTH MEASUREMENT TOOL AND PNEUMATIC PRESSURE GAUGE SYSTEMS AND METHODS

CROSS REFERENCE TO RELATED APPLICATIONS

This document claims the benefit of the filing date of U.S. Provisional Patent Application 61/429,699, entitled "Tire Pressure Gauge with an Integrated Tire Tread Depth Gauge and Method of Checking Tire Depth," to C. Kwai Kong, et al., which was filed on Jan. 4, 2011, the contents of which are hereby incorporated by reference.

BACKGROUND

1. Technical Field

Aspects of this document relate generally to combination tire tread depth measurement tools and pneumatic tire pressure gauge systems for pneumatic tires, and methods for using such systems.

2. Background Art

Worn or improperly inflated tires are a large cause of automobile accidents. For example, low tire tread decreases traction in rainy or snowy conditions, increases the risk of hydroplaning, and increases the risk for tire blowouts and flats. Because of this safety risk, most states in the United States of America have defined tread depths for legally worn out tires. Furthermore, over- or under-inflated tires contribute cause dangerous conditions, including blowouts. Underinflated tires also increase tread wear. Improper tire inflation also reduces fuel efficiency. Because of these concerns, automobile operators should monitor tread depth and tire pressure regularly. However, many people are ill-equipped to do this, and they leave it up to professionals rather than taking a less expensive, more convenient do-it-yourself approach. Even more troublesome, some people are too busy or lazy to check their tread depth and tire pressure at all. Additionally, many people have farsightedness or other vision impairments, particularly elderly drivers who are often at a higher risk for exploitation by auto mechanics. These impairments, while not always so severe as to preclude driving, make it difficult to resolve the tiny markings on conventional tread depth measurement tools. For those with such impairments, the notion of using tools with tiny, indiscernible markings is frustrating. Further, professionals have a need for inexpensive, convenient tools that expedite their offered services, and some professionals also have vision problems.

Conventional tire pressure gauges are used to measure the air pressure within a tire by placing a connector on one end of the gauge over the valve of a tire. When the connector is pushed against the valve stem, the pneumatic pressure of the air in the tire forces a measurement element to extend out of the opposite end of the tire pressure gauge. A tire with greater pneumatic pressure will force the measurement element out further than a tire with less pressure. The measurement element of conventional tire pressure gauges typically includes markings or scales that relate to the pounds per square inch (PSI), kilopascals (KPA), bars, or other unit of pneumatic pressure within the tire. Tire tread depth gauges and pneumatic pressure gauges, however, are conventionally separate tools with separate parts. However, some conventional tools exist that combine the tread depth measurement with the pneumatic pressure gauge.

For example, U.S. Pat. No. 3,696,668 to Patrick discloses a combined air pressure and tread depth gauge for pneumatic tires. Here, an indicator slide is disclosed that has a pressure indicating face and a tread depth indicating face opposite the pressure indicating face. However, it is extremely difficult to read the tiny markings on the tread depth indicating face. Further, if the slide is inserted the wrong way, the markings will be even harder to see; additional movement of the device to make the markings visible after taking the measurement carries a risk that the indicator slide will inadvertently slide forward or backward, thus distorting the measurement.

U.S. Pat. No. D317,880 to Meehan discloses a particular design of a combination tire pressure and tread depth gauge. However, the tread depth markers are, again, very small and difficult to distinguish, especially for someone with farsightedness. Further, a stopper flange is shown that prevents the slide from retracting. Therefore, the tread depth would have to be marked on the slide before determining the measurement, or determined while the slide is inserted into the tread. Again, the tiny markings make this problematic as they are not readily distinguishable.

SUMMARY

Aspects of a combined tread depth measurement tool and pressure gauge for treaded pneumatic tires may comprise a housing comprising a first end, a second end opposite the first end, and an abutment surface substantially flush with the first end, the abutment surface having at least one dimension width sufficient to simultaneously engage portions of tire tread on opposing sides of a tread void, and a pneumatic pressure sensor within the housing and extending from the first end to the second end of the housing, the pneumatic pressure sensor comprising at the second end of the housing a connector sized to mate with a tire valve stem and core, and a measurement element slidingly engaged with the pneumatic pressure sensor at the first end of the housing, wherein the pneumatic pressure sensor is configured to thrust the measurement element outward to an extent proportional to an elevated pneumatic pressure applied to it and to leave the measurement element so extended when the elevated pneumatic pressure is relieved, thereby providing an indication of pneumatic pressure, wherein the measurement element comprises a graduated numerical indication of pneumatic pressure on at least one side of the measurement element and a colored indication of tire depth on at least one side of the measurement element, the colored indication comprising at least three distinct colors, the three distinct colors each comprising widths corresponding to ranges of tread depths in reference to a terminal end of the measurement element.

Particular embodiments and implementations may comprise one or more of the following features. The housing may be cylindrical for a majority of its length. The abutment surface may be round. The abutment surface may be rectangular with rounded corners. The colored indication may be on the same side of the measurement element as the graduated numerical indication. The measurement element may be rectangular prismal in shape and the numerical indication and the colored indication may be on adjacent sides. A first of the three distinct colors may be red and may comprise a first area defined on one side by an edge formed by the terminal end, a second of the three distinct colors may be yellow and may comprise a second area defined on one side by an edge shared with the first area, and a third of the three distinct colors may be green and may comprise a third area defined on one side by an edge shared with the second area.

Aspects of a combined tread depth measurement tool and pressure gauge for treaded pneumatic tires may comprise a body assembly comprising a housing comprising a first end, a second end opposite the first end, a housing axis spanning from the first end do the second end, and a first color band comprising a first distinct color, a second color band comprising a second distinct color, and a third color band comprising a third distinct color, wherein the first, second, and third distinct colors are different, a pneumatic pressure sensor within the housing and extending from the first end to the second end of the housing, the pneumatic pressure sensor comprising at the second end of the housing a connector sized to mate with a tire valve stem and core, and a measurement element slidingly engaged with the pneumatic pressure sensor at the first end of the housing, wherein the pneumatic pressure sensor is configured to thrust the measurement element outward to an extent proportional to an elevated pneumatic pressure applied to it and to leave the measurement element so extended when the elevated pneumatic pressure is relieved, thereby providing an indication of pneumatic pressure, a retracted terminus defined by a point on the body assembly that is most distal from the second end of the body assembly when the measurement element is maximally retracted into the housing, wherein the first color band comprises a first distance from the refracted terminus, the second color band comprises a second distance from the retracted terminus, the third color band comprises a third distance from the retracted terminus, wherein the second distance is greater than the first distance and less than the third distance, and a spring clip slidingly engaged with the housing, the spring clip comprising a sliding portion comprising an edge proximal to the second end of the housing, a clip portion, the clip portion comprising a tire engagement end, the clip portion extending from the sliding portion in a direction toward the first end of the housing, wherein the tire engagement end has a minimum dimension width sized to fit inside a tread void of a treaded pneumatic tire and engage the tire at a deepest portion of the tread void, and a spring clip length defined, in a line parallel to the axis of the housing, by a length from a most distal point of the tire engagement end to the edge of the sliding portion proximal to the second end of the housing, wherein the first distance is defined by a difference between the spring clip length and a minimum good tread depth, the second distance is defined by a difference between the spring clip length and a minimum marginal tread depth, and the third distance is defined by a difference between the spring clip length and a minimum bad tread depth.

Particular embodiments and implementations may comprise one or more of the following features. The minimum good tread depth may be about eight thirty-seconds of an inch, the minimum marginal tread depth may be about four thirty-seconds of an inch, and the minimum bad tread depth may be about zero. The first color band may abut the second color band and the second color band may abut the third color band, wherein the first distance may comprise a maximum distance between the first color band and the first end, the second distance may comprise a maximum distance between the second color band and the first end, and the third distance may comprise a maximum distance between the third color band and the first end.

Aspects of a method of measuring the pneumatic pressure and tread depth of a tire with a combination tool may comprise holding a housing of a combination tool, the housing comprising a first end, a second end opposite the first end, and a connector at the second end, pressing the connector of the combination tool against a tire valve stem to cause a measurement element to thrust out from the first end of the housing, reading a visible quantitative indicator that is most proximal to the first end of the housing, wherein the visible quantitative indicator is on the measurement element and corresponds to the pneumatic pressure of the tire, inserting a terminal end of the measurement element into a void of a tire tread, engaging the terminal end of the measurement element with the tire, forcing the measurement element back into the housing by pushing the housing toward the tire until an abutment surface on the housing contacts a portion of the tire tread adjacent to the tread void, identifying an exposed color on the measurement element, and correlating the exposed color with a status of the tire tread.

Particular embodiments and implementations may comprise one or more of the following features. The status of the tire tread may indicate whether the tire tread depth is bad, marginal, or good. A red exposed color may indicate the tire tread is bad, a yellow exposed color may indicate the tire tread is marginal, and a green exposed color may indicate the tire tread is good.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended combination tire tread depth measurement tools and pneumatic tire pressure gauges and/or assembly procedures for making or using combination tire tread depth measurement tools and pneumatic tire pressure gauges will become apparent for use with implementations of the combination tire tread depth measurement tools and pneumatic tire pressure gauges from this disclosure. Accordingly, for example, although particular materials and methods are disclosed for constructing combination tire tread depth measurement tools and pneumatic tire pressure gauge, such materials, methods, and implementing components may, unless expressly limited, comprise any shape, size, style, type, model, version, measurement, concentration, material, quantity, and/or the like as is known in the art for such combination tire tread depth measurement tools and pneumatic tire pressure gauge and implementing components, consistent with the intended operation of the combination tire tread depth measurement tools and pneumatic tire pressure gauge.

Figure 6:
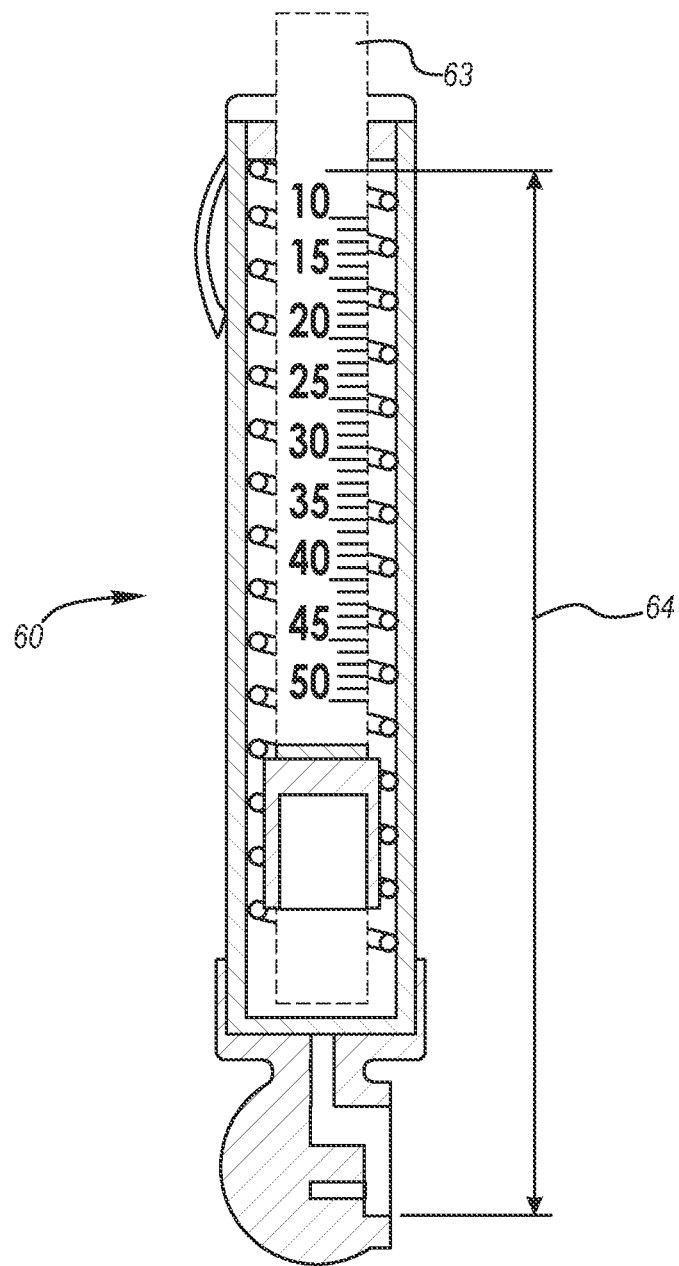
FIG. 6 is a sectional view of a known pressure sensor.

Particular embodiments of combined tread depth measurement tool and pneumatic pressure gauge 10 are disclosed. Referring to FIGS. 1 and 2, particular embodiments include a housing 11, an abutment surface 12, a measurement element 13, and a pneumatic pressure sensor 14. The measurement element 13 is slidingly engaged with the pressure sensor 14 at the first end 17 of the housing 11. A more detailed example of a particular embodiment of a pneumatic pressure sensor 14 is shown in FIG. 6, which depicts a known pressure sensor 64, in connection with a housing 60 and a measurement indicator 63, that could be readily adapted for use with the disclosed implementations. Other known pressure sensors could be readily adapted to the disclosed implementations.

As shown in FIGS. 1-4, some implementations include a connector 15 coupled with the pressure sensor 14. In such implementations, the connector 15 is adapted to mate with a tire valve stem and core. Conventional connectors 15 include a nipple 16 that, when engaged with a tire valve, opens the tire valve. The connector 15 is further adapted to direct gas flowing from the open tire valve to the pressure sensor 14. The pressure sensor 14 reacts to the increased pressure provided by the gas flowing from the open tire valve. In reaction, the pressure sensor 14, using force from the increased pressure, thrusts the measurement element 13 away from the connector 15.

In some implementations, the end of the housing distal from the connector is a first end 17 and the end of the housing proximal to the connector is a second end 18. Thus, the first end 17 is opposite the second end 18.

In some implementations, the housing 11 is cylindrically shaped for a majority of its length. Other cross sectional shapes, however, may be used for the housing 11 consistent with the disclosed embodiments. For example, in some embodiments, the housing 11 has a polygonal cross-sectional shape. In some implementations, the housing 11 has an axis 19 spanning from the first end 17 to the second end 18.

Figure 7:
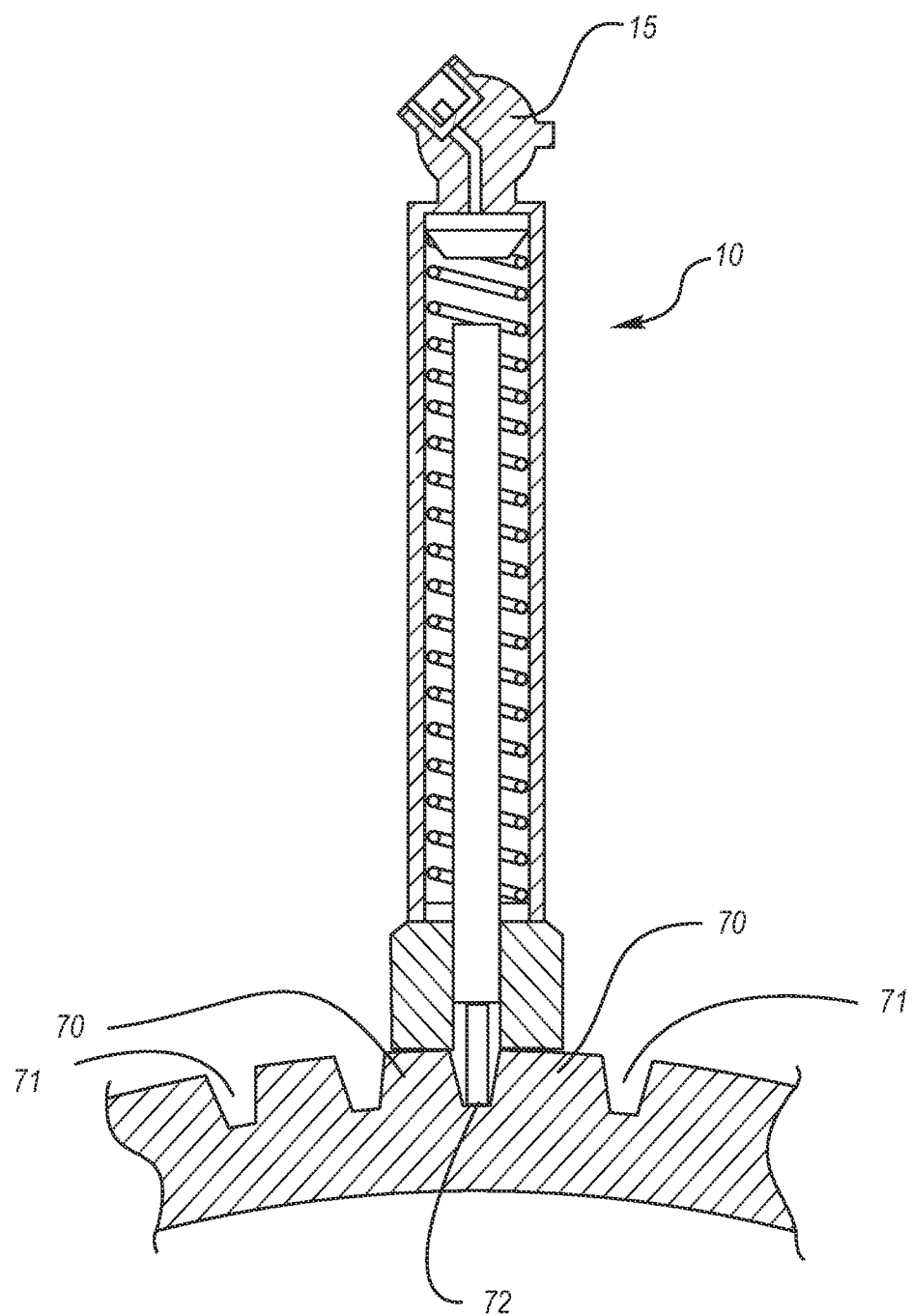
FIG. 7 is a sectional view of a particular embodiment of a combined tread depth measurement tool and pneumatic pressure gauge and a treaded tire.

As shown in the particular implementation of FIGS. 1-4, an abutment surface 12 is proximal to the first end 17 of the housing 11. In some implementations, like the one shown in FIGS. 1-4, the abutment surface 12 is substantially flush with the first end 17. In some implementations, like the one shown in FIGS. 1-4, substantially flush means that the abutment surface forms a plane that is substantially orthogonal to the axis 19. According to implementations, the flush abutment surface 12 forms a plane and has as dimension, such as a width, large enough to simultaneously engage portions of a tire tread 70 on opposite sides of a tread void 71, as shown in FIG. 7. In some implementations, the abutment surface is constructed of a durable material that resists flexion when pressed against a tire tread.

In some implementations, as shown in FIGS. 1-2, the measurement element 13 is marked with quantitative indicators 20. As shown, quantitative indicators 20 include evenly spaced hash marks or dots with numerals indicating particular measurements in pounds per square inch ("PSI"). Other units of pressure may be used, such as kilopascals (KPA), bars, etc. Further, other marking arrangements may be used to denote the pressure.

Figure 1A:
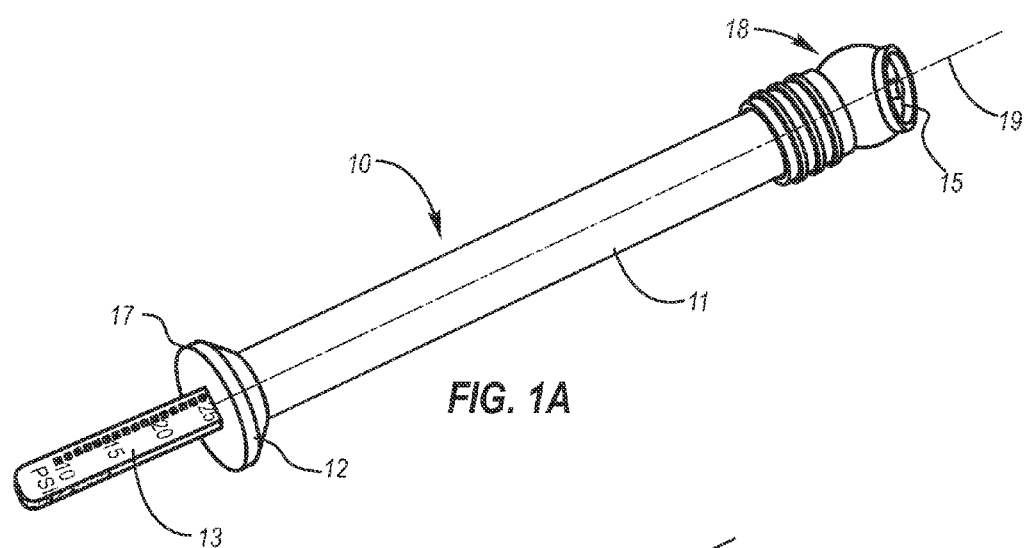
FIG. 1A is a perspective view of a particular embodiment of a combined tread depth measurement tool and pneumatic pressure gauge.
Figure 1B:
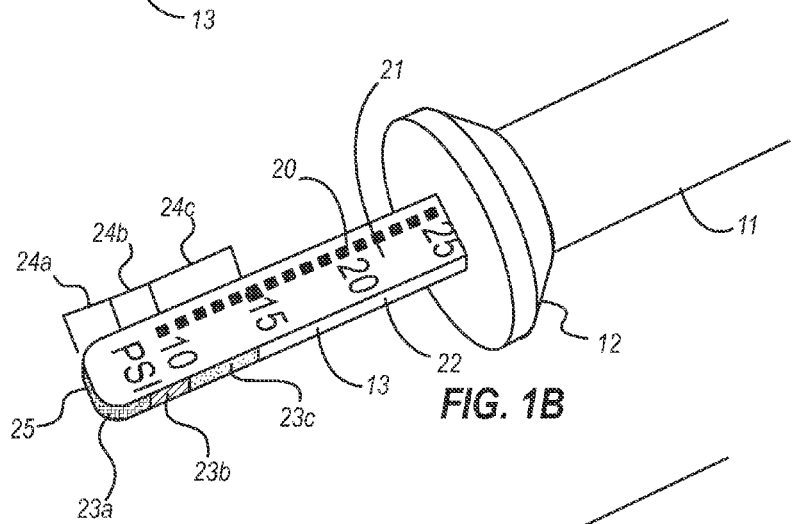
FIG. 1B is an expanded view of a portion of FIG. 1A.
Figure 1C:
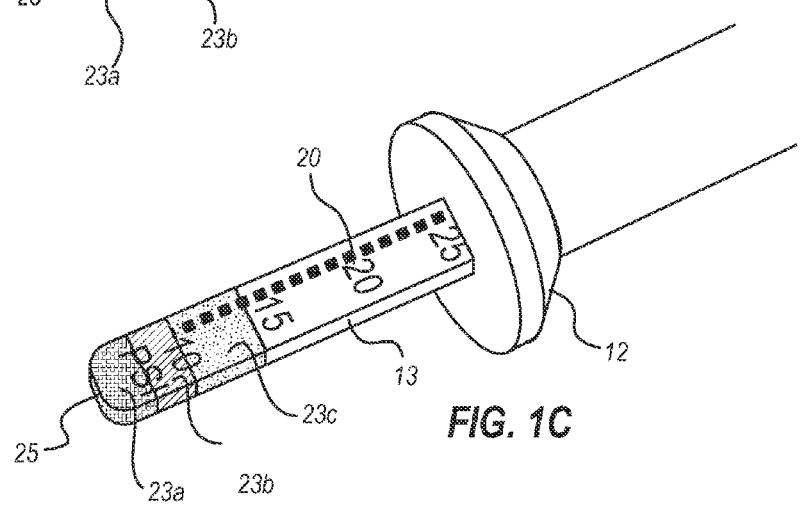
FIG. 1C shows particular embodiment of a combined tread depth measurement tool and pneumatic pressure gauge.
Figure 2A:
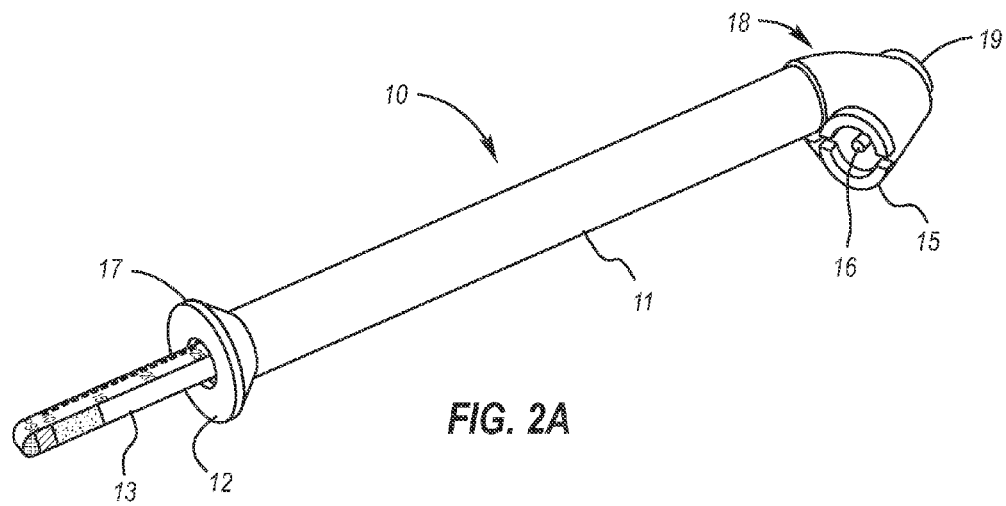
FIG. 2A is a perspective view of a particular embodiment of a combined tread depth measurement tool and pneumatic pressure gauge.
Figure 2B:
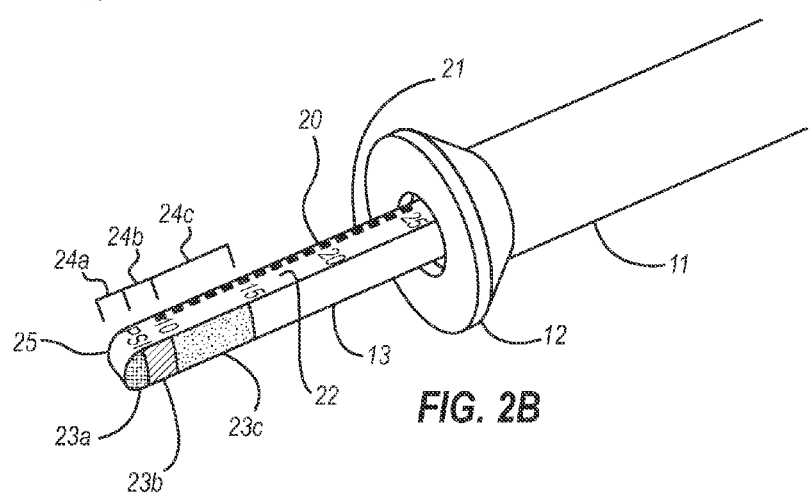
FIG. 2B is an expanded view of a portion of FIG. 2A.
Figure 2C:
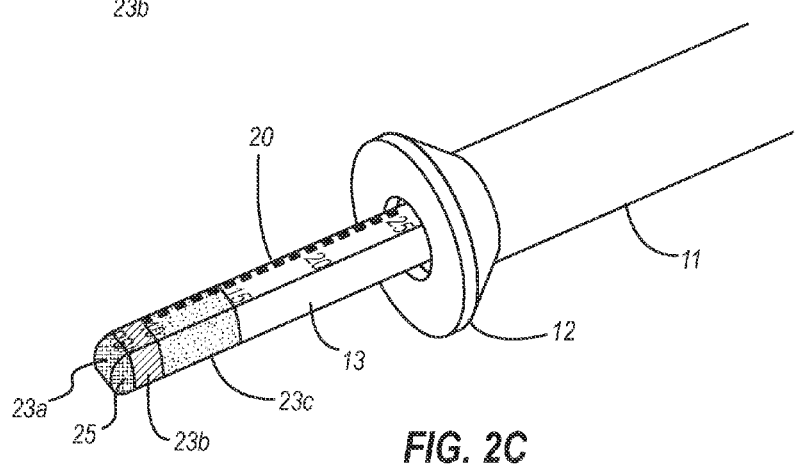
FIG. 2C shows particular embodiment of a combined tread depth measurement tool and pneumatic pressure gauge.

In some implementations, as shown in FIGS. 1A-C, the measurement element 13 is substantially flat, having a wide first face 21 and a narrow second face 22. In other implementations, as shown in FIGS. 2A-C, the measurement element 13 has a more square cross-sectional shape, where the widths of the first face 21 and second face 22 are more similar. Other cross-sectional shapes may be used for the measurement element 13, including a round cross-sectional shape.

According to embodiments, the measurement element is also colored in a distinct manner. For example, as shown in FIGS. 1A, 1B, 2A, and 2B, areas of the second face 22 of the measurement element 13 are colored. Three distinct colors 23a, 23b, and 23c, are used. The three colored areas 23a, 23b, and 23c, have widths 24a, 24b, and 24c and correspond to ranges of tread depths, as measured from a terminal end 25 of the measurement element 13. As shown in these particular implementations, green 23a is used to indicate ranges of good tread depths, yellow 23b is used to indicate ranges of marginal tread depths, and red 23c is used to indicate bad tread depths. The colored areas 23a, 23b, and 23c, can be seen by a person simultaneously with the quantitative indicators 20 in these particular embodiments.

In some implementations, as shown in FIGS. 1C and 2C, the colored areas 23a, 23b, and 23c are on the same face of the measurement element 13 as the quantitative indicators 20. In some implementations, the colored areas 23a, 23b, and 23c are on a face opposite from the quantitative indicators 20. In some implementations, the colored areas 23a, 23b, and 23c encompass all faces of the measurement element 13, within their respective widths 24a, 24b, and 24c.

Figure 3A:
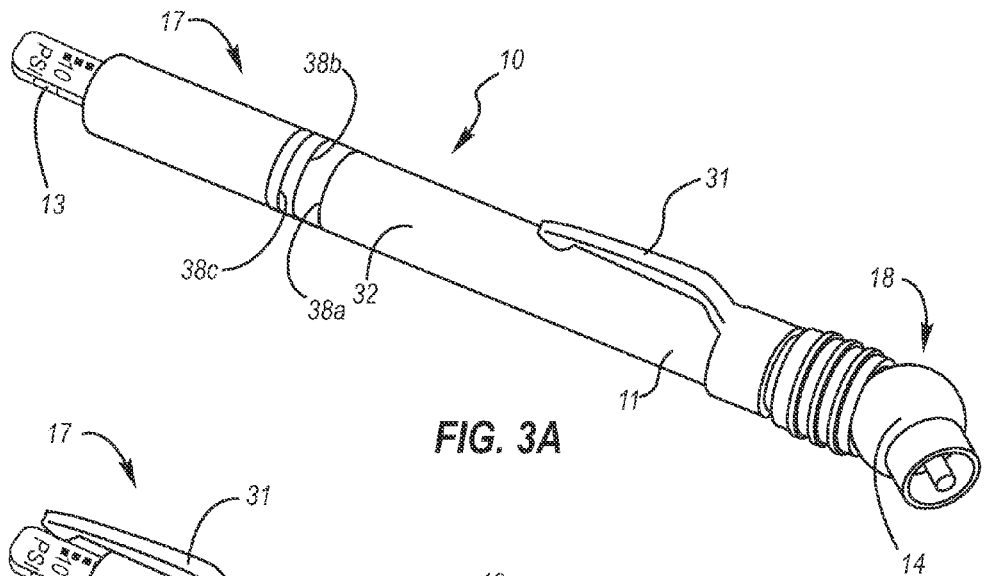
FIG. 3A is a perspective view of a particular embodiment of a combined tread depth measurement tool and pneumatic pressure gauge.
Figure 3B:
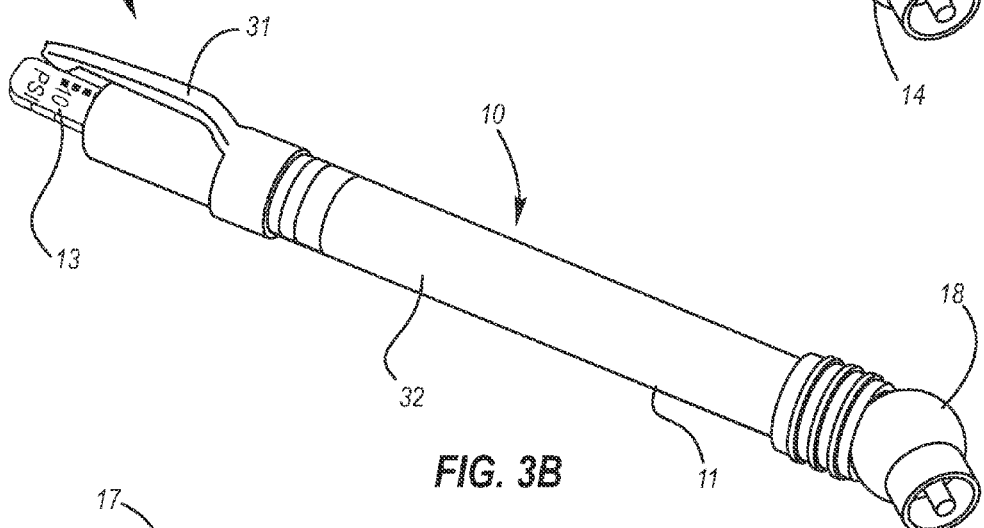
FIG. 3B is another view of the particular embodiment of the combined tread depth measurement tool and pneumatic pressure gauge shown in FIG. 3A.
Figure 4:
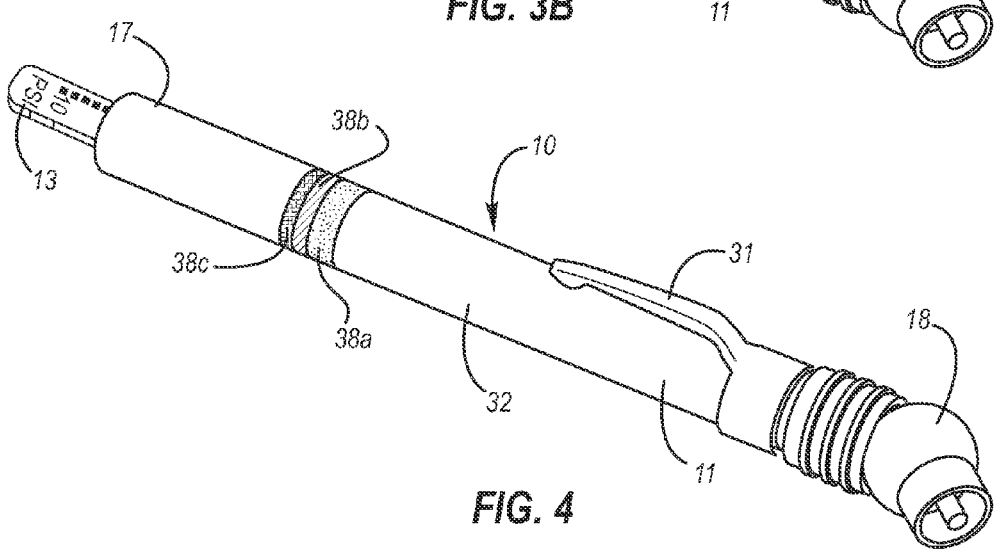
FIG. 4 is a perspective view of a particular embodiment of a combined tread depth measurement tool and pneumatic pressure gauge.
Figure 5A:
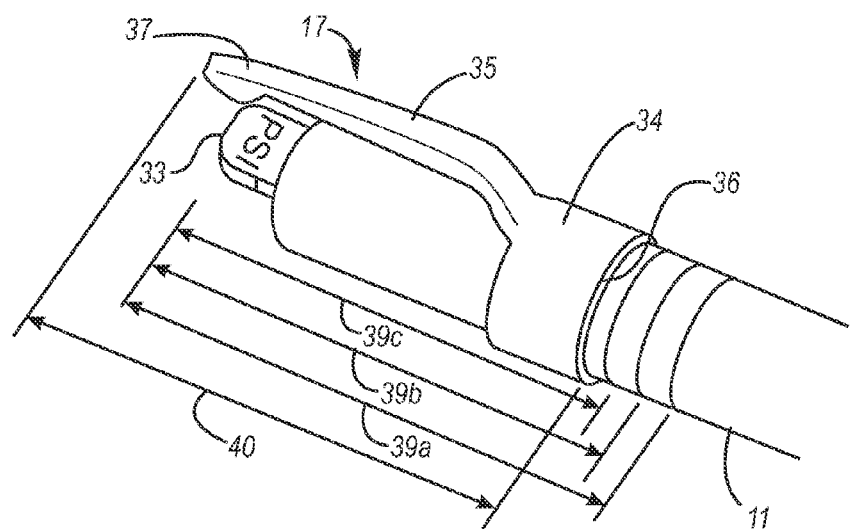
FIG. 5A is an expanded view of the particular embodiment of a combined tread depth measurement tool and pneumatic pressure gauge shown in FIG. 3B.
Figure 5B:
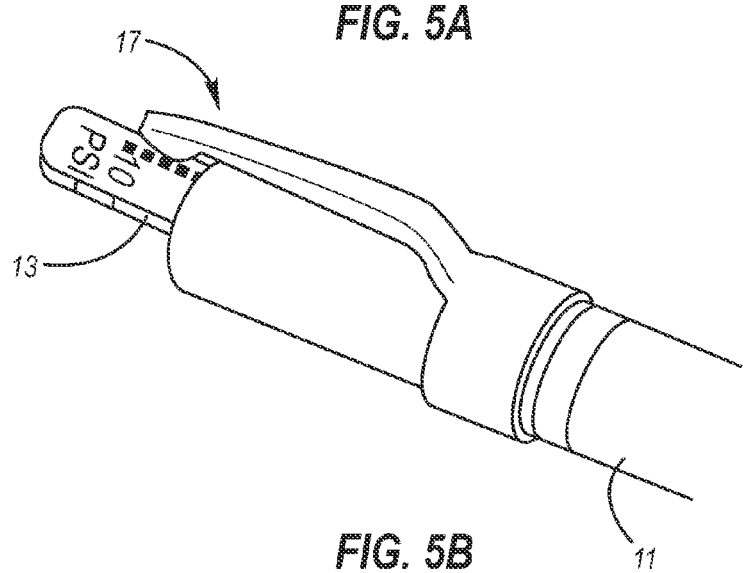
FIG. 5B is second view of the combined tread depth measurement tool and pneumatic pressure gauge shown in FIG. 5A.
Figure 5C:
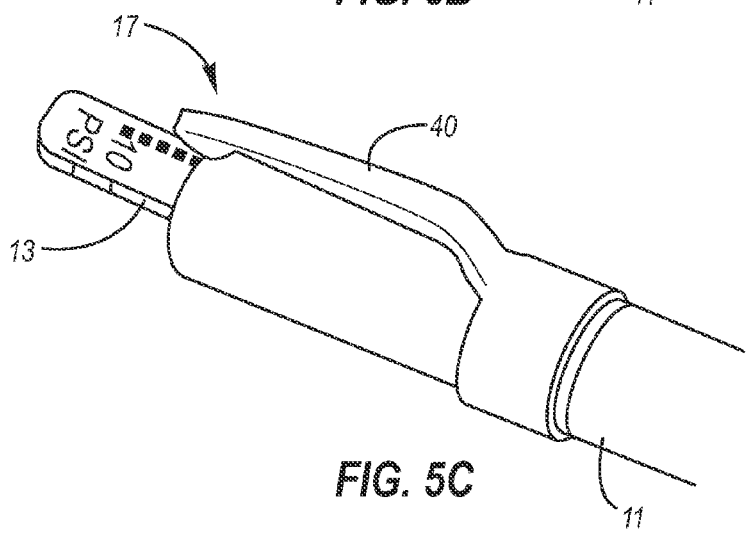
FIG. 5C is a third view of the combined tread depth measurement tool and pneumatic pressure gauge shown in FIG. 5B.

Turning now to other particular embodiments, FIGS. 3-5 include embodiments that have a spring clip 31 slidingly engaged with the housing 11. As a reference, such embodiments include a body assembly 32 that includes the housing 11, measurement element 13, and pressure sensor 14. Just as in the previously described embodiments, the measurement element 13 here can slide can be extended from and retracted into the housing 11. As a further reference, embodiments as shown in FIGS. 3-5 include a retracted terminus 33, which is defined as the point on the body assembly 32 that is most distal from the second end 18 of the housing 11 when the measurement element 13 is fully or maximally retracted into the housing 11. It will be understood that, depending on the particular implementation, the retracted terminus 33 may or may not be on the measurement element 13. For example, if, at its maximally retracted position, the measurement element 13 protrudes from the housing 11 (as shown in FIGS. 3-5), then the retracted terminus 33 is located at the tip of the measurement element 13 furthest from the second end 18 of the housing 11. However, in some implementations, the measurement element 13 will not protrude from the housing 11 when in its fully refracted position. In such cases, the retracted terminus 33 would be located on some other point on the body assembly 32, such as on the housing 11.

In some embodiments, the spring clip 31 may be manually slid from a position proximal to the second end 18 of the housing 11 (as shown in FIG. 3A) to a position proximal to the first end 17 (as shown in FIG. 3B), and vice-versa. In other words, there is a coefficient of friction between the spring clip 31 and the housing 11 that is sufficient to keep the spring clip 31 from sliding unless purposely or materially acted upon. For example, in some such embodiments, neither the force of gravity nor the centripetal force caused by incidental manual swinging of the tool 10 is sufficient to overcome this coefficient of friction.

In some implementations, the spring clip 31 is used in conventional ways, such as for securing the tool 10 to a pocket or other surface. In some cases, the spring clip 31 is formed integrally, while in other cases the components of the spring clip 31 are formed separately and subsequently coupled together. In some implementations, the spring clip includes a sliding portion 34 and a clip portion 35. In such implementations, the sliding portion defines an edge 36 proximal to the second end 18 of the housing 11. In some implementations, the edge 36 is perpendicular to (or, if curved, includes a plane that is orthogonal to) the axis 19. Further, in some implementations, the clip portion 35 includes a tire engagement end 37.

In some implementations, as shown in FIGS. 3-5, the tire engagement end 37 is sized sufficiently small that it may be inserted into a tire tread void 71 and engage the tire 72 at a deepest portion of the tread void 71. Further, the portion of the body assembly 32 associated with the retracted terminus 33 is shaped and spaced sufficiently from the engagement end 37 that it will engage a portion of the tire tread 70 adjacent to the tread void 71 while the tire engagement end 37 engages the deepest portion of the tread void 71. Further, the coefficient of friction, as described above, is small enough that when a person manually inserts the engagement end 37 into a tread void 71 and pushes the tool 10 toward the tire with a reasonably small force, the sliding portion 34 will slide along the housing 11. In this manner a person ascertains the tread depth by observing which colored band 38a, 38b, or 38c (described below) remains exposed and most proximal to the edge 36.

As shown in FIGS. 3-5, some implementations that include a spring clip 31 include colored bands 38a, 38b, and 38c on the housing 11. In some cases, such colored bands 38a, 38b, and 38c encompass the housing 11, as shown, such that the colored bands 38a, 38b, and 38c can be viewed from nearly any angle. In some implementations, as shown in FIG. 4, the colored bands 38a, 38b, and 38c are wide and abut one another.

In some implementations, each colored band 38a, 38b, and 38c is located at a particular distance 39a, 39b, and 39c from the retracted terminus 33. For example, in some implementations, the particular distance 39a, 39b, and 39c is approximately equal to the length 40 of the spring clip 31, as measured from the edge 36 to the engagement end 37 minus a value that corresponds to a minimum tire depth threshold. For example, in some implementations, a minimum tire depth threshold for a "good" depth is about eight thirty-secondths of an inch, a minimum tire depth threshold for a "marginal" depth is about four thirty-secondths of an inch, and a minimum tire depth threshold for a "bad" depth is about zero. The following illustration provides further explanation.

In some embodiments with the minimum tire depth thresholds defined above, the length 40 of the spring clip is two inches, and "good" is associated with a green band, "marginal" is associated with a yellow band, and "bad" is associated with a red band. Thus, the red band 38a is located at a distance 39a of about two inches (length 40 (two inches) minus minimum tire depth threshold for a "bad" depth (zero) equals two inches) from the retracted terminus 33. The yellow band 38b is located at a distance 39b of about one and twenty-eight thirty-secondths of an inch (two inches minus four thirty-secondths of an inch) from the retracted terminus 33. The green band 38c is located at a distance 39c of about one and twenty-four thirty-secondths of an inch (two inches minus eight thirty-secondths of an inch) from the retracted terminus 33. In this example, when a person uses the tool 10 to measure tread depth, a tread depth exceeding about eight thirty-secondths of an inch will reveal the green band 38c as the band most proximal to the edge 36. If the tread depth exceeds about four thirty-secondths of an inch up to about eight thirty secondths of an inch, the yellow band 38b will be revealed as the band most proximal to the edge 36, the green band 39c being covered. If, however, the tread depth is less than about four thirty-secondths of an inch, down to zero, then the red band 38a will be revealed, the yellow 38b and green 38c bands being covered.

In some embodiments, as shown in FIG. 4, the colored bands 38a, 38b, and 38c, are wide bands that abut one another, rather than being separated lines. In such embodiments, the distance 39a, 39b, and 39c is measured from the retracted terminus 33 to the portion of the respective colored band 38a, 38b, and 38c that is most distal from the retracted terminus 33.

In some implementations, a viewing window is provided in the sliding portion 34 and the length 40 of the spring clip 31 is measured from a point within the viewing window, rather than from the edge 36. Thus, in such implementations, the appropriate color is visible through the viewing window.

In some embodiments, colors other than those specifically disclosed herein are used. In such embodiments, the colors are distinguishable and generally connote at least three levels of tire depth. In some embodiments, only two colors are used in all places where three colors are mentioned.

It will be understood that "good," "marginal," and "bad," in some embodiments, have highly subjective meanings (and thus the corresponding depths are variable). In other embodiments, these terms correlate directly with industry-wide standards. For example, "bad" may correlate with "legally worn," "dangerously low," or some other connotation. "Marginal" may correlate with "warning," "needs replacing soon," or some other connotation. Similarly, "good" may be correlated with "sufficient tread depth," "adequate," or some other connotation.

It will be understood that implementations are not limited to the specific components disclosed herein, as virtually any components consistent with the intended operation of a method and/or system implementation for combination tire tread depth measurement tools and pneumatic tire pressure gauges may be utilized. Accordingly, for example, although particular specifications for housing 11, measurement elements 13, abutment surfaces 12, spring clips 31, colored areas 23a, 23b, and 23c, colored bands 38a, 38b, and 38c, and other components may be disclosed, such components may comprise, unless expressly limited, any shape, size, style, type, model, version, class, grade, measurement, concentration, material, weight, quantity, and/or the like consistent with the intended operation of a method and/or system implementation for a combination tire tread depth measurement tools and pneumatic tire pressure gauge may be used.

In places where the description above refers to particular implementations of combination tire tread depth measurement tools and pneumatic tire pressure gauges, it should be readily apparent that a number of modifications may be made without departing from the spirit thereof and that these implementations may be applied to other combination tire tread depth measurement tools and pneumatic tire pressure gauges. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A combined tread depth measurement tool and pressure gauge for treaded pneumatic tires comprising:
   a housing comprising a first end, a second end opposite the first end, and an abutment surface substantially flush with the first end, the abutment surface having at least one dimension width sufficient to simultaneously engage portions of tire tread on opposing sides of a tread void; and
   a pneumatic pressure sensor within the housing and extending from the first end to the second end of the housing, the pneumatic pressure sensor comprising at the second end of the housing a connector sized to mate with a tire valve stem and core, and a measurement element slidingly engaged with the pneumatic pressure sensor at the first end of the housing, wherein the pneumatic pressure sensor is configured to thrust the measurement element outward to an extent proportional to an elevated pneumatic pressure applied to it and to leave the measurement element so extended when the elevated pneumatic pressure is relieved, thereby providing an indication of pneumatic pressure;
   wherein the measurement element comprises a graduated numerical indication of pneumatic pressure on at least one side of the measurement element and a colored indication of tire depth on at least one side of the measurement element, the colored indication comprising at least three distinct colors, the three distinct colors each comprising widths corresponding to ranges of tread depths in reference to a terminal end of the measurement element.

2. The combined tread depth measurement tool and pressure gauge of claim 1, wherein the housing is cylindrical for a majority of its length.

3. The combined tread depth measurement tool and pressure gauge of claim 1, wherein the abutment surface is round.

4. The combined tread depth measurement tool and pressure gauge of claim 1, wherein the abutment surface is rectangular with rounded corners.

5. The combined tread depth measurement tool and pressure gauge of claim 1 wherein the colored indication is on the same side of the measurement element as the graduated numerical indication.

6. The combined tread depth measurement tool and pressure gauge of claim 1, wherein the measurement element is rectangular prismal in shape and wherein the numerical indication and the colored indication are on adjacent sides.

7. The combined tread depth measurement tool and pressure gauge of claim 6, wherein a first of the three distinct colors is red and comprises a first area defined on one side by an edge formed by the terminal end, a second of the three distinct colors is yellow and comprises a second area defined on one side by an edge shared with the first area, and a third of the three distinct colors is green and comprises a third area defined on one side by an edge shared with the second area.

8. A combined tread depth measurement tool and pressure gauge for treaded pneumatic tires comprising:
   a body assembly comprising:
      a housing comprising a first end, a second end opposite the first end, a housing axis spanning from the first end do the second end, and a first color band comprising a first distinct color, a second color band comprising a second distinct color, and a third color band comprising a third distinct color, wherein the first, second, and third distinct colors are different;
      a pneumatic pressure sensor within the housing and extending from the first end to the second end of the housing, the pneumatic pressure sensor comprising at the second end of the housing a connector sized to mate with a tire valve stem and core, and a measurement element slidingly engaged with the pneumatic pressure sensor at the first end of the housing, wherein the pneumatic pressure sensor is configured to thrust the measurement element outward to an extent proportional to an elevated pneumatic pressure applied to it and to leave the measurement element so extended when the elevated pneumatic pressure is relieved, thereby providing an indication of pneumatic pressure;

a retracted terminus defined by a point on the body assembly that is most distal from the second end of the body assembly when the measurement element is maximally retracted into the housing, wherein the first color band comprises a first distance from the retracted terminus, the second color band comprises a second distance from the retracted terminus, the third color band comprises a third distance from the retracted terminus, wherein the second distance is greater than the first distance and less than the third distance; and a spring clip slidingly engaged with the housing, the spring clip comprising:
  a sliding portion comprising an edge proximal to the second end of the housing;
  a clip portion, the clip portion comprising a tire engagement end, the clip portion extending from the sliding portion in a direction toward the first end of the housing, wherein the tire engagement end has a minimum dimension width sized to fit inside a tread void of a treaded pneumatic tire and engage the tire at a deepest portion of the tread void; and
  a spring clip length defined, in a line parallel to the axis of the housing, by a length from a most distal point of the tire engagement end to the edge of the sliding portion proximal to the second end of the housing;
  wherein the first distance is defined by a difference between the spring clip length and a minimum good tread depth, the second distance is defined by a difference between the spring clip length and a minimum marginal tread depth, and the third distance is defined by a difference between the spring clip length and a minimum bad tread depth.

9. The combined tread depth measurement tool and pressure gauge of claim 8, wherein the minimum good tread depth is about eight thirty-seconds of an inch, the minimum marginal tread depth is about four thirty-seconds of an inch, and the minimum bad tread depth is about zero.

10. The combined tread depth measurement tool and pressure gauge of claim 9, wherein the first color band abuts the second color band and the second color band abuts the third color band, wherein the first distance comprises a maximum distance between the first color band and the first end, the second distance comprises a maximum distance between the second color band and the first end, and the third distance comprises a maximum distance between the third color band and the first end.

11. The combined tread depth measurement tool and pressure gauge of claim 8, wherein the first color band abuts the second color band and the second color band abuts the third color band, wherein the first distance comprises a maximum distance between the first color band and the first end, the second distance comprises a maximum distance between the second color band and the first end, and the third distance comprises a maximum distance between the third color band and the first end.

12. A method of measuring the pneumatic pressure and tread depth of a tire with a combination tool, the method comprising:
  holding a housing of a combination tool, the housing comprising a first end, a second end opposite the first end, and a connector at the second end;
  pressing the connector of the combination tool against a tire valve stem to cause a measurement element to thrust out from the first end of the housing;
  reading a visible quantitative indicator that is most proximal to the first end of the housing, wherein the visible quantitative indicator is on the measurement element and corresponds to the pneumatic pressure of the tire;
  inserting a terminal end of the measurement element into a void of a tire tread, engaging the terminal end of the measurement element with the tire;
  forcing the measurement element back into the housing by pushing the housing toward the tire until an abutment surface on the housing contacts a portion of the tire tread adjacent to the tread void;
  identifying an exposed color on the measurement element; and
  correlating the exposed color with a status of the tire tread.

13. The method of claim 12, wherein the status of the tire tread indicates whether the tire tread depth is bad, marginal, or good.

14. The method of claim 13, wherein a red exposed color indicates the tire tread is bad, a yellow exposed color indicates the tire tread is marginal, and a green exposed color indicates the tire tread is good.

* * * * *